(12) United States Patent
Gordon

(10) Patent No.: US 6,928,228 B2
(45) Date of Patent: Aug. 9, 2005

(54) SYSTEM AND METHOD FOR DETECTION AND ANALYSIS OF VIDEO RECORDINGS

(75) Inventor: Goren Gordon, Rishon Le-Zion (IL)

(73) Assignee: Gordonomics Ltd. (IL)

(*) Notice: Subject to any disclaimer, the term of this patent is extended or adjusted under 35 U.S.C. 154(b) by 412 days.

(21) Appl. No.: 10/152,310

(22) Filed: May 20, 2002

(65) Prior Publication Data

US 2003/0095782 A1 May 22, 2003

(30) Foreign Application Priority Data

Nov. 20, 2001 (IL) ............................................... 146597
Nov. 21, 2001 (WO) ................................ PCT/IL01/01074

(51) Int. Cl.[7] ................................................ H04N 9/79
(52) U.S. Cl. ............................. 386/45; 386/1; 386/46; 369/53.31; 369/53.12; 369/53.44
(58) Field of Search ............................... 386/1, 45, 46, 386/125–126; 369/53.31, 53.12, 53.44, 53.34

(56) References Cited

U.S. PATENT DOCUMENTS 5,384,703 A * 1/1995 Withgott et al. ............ 715/531
2002/0009146 A1 * 1/2002 Hall et al. ............. 375/240.24

* cited by examiner

Primary Examiner—Andrew Faile
Assistant Examiner—Alicia M Duggins
(74) Attorney, Agent, or Firm—Wolf, Greenfield & Sacks, P.C.

(57) ABSTRACT

A system and method for detection and analysis of video recording is disclosed. The method comprises receiving a video recording, calculating complexity values of video recording received, comparing the calculated complexity values with reference complexity values, and displaying analysis of video recording on a user interface is disclosed. The system comprises an input device for receiving video recording, a computing device for calculating complex values of received video recording, a comparator device for comparing complex values of video recording, and a storage device for storing internal data.

5 Claims, 1 Drawing Sheet

SYSTEM AND METHOD FOR DETECTION AND ANALYSIS OF VIDEO RECORDINGS

CROSS REFERENCE TO RELATED APPLICATIONS

This application claims priority from PCT Application No. PCT/IL01/01074, filed Nov. 21, 2001, and Israeli Patent Application No. 146597, filed Nov. 20, 2001, each of which is hereby incorporated by reference as if fully set forth herein.

BACKGROUND OF THE INVENTION

The present invention relates to the detection and analysis of video recordings, in general, and to the detection and analysis of video recordings, in particular.

Overview of particular areas using video recording can be used for various applications such as supervision, control and the like. Guarding and tracking a zone captured by a video recording for keeping unauthorized persons from entering to a restricted area is one broadly used application of video recording. Accordingly, one or more persons inspect the video recording displayed over a monitor that can be positioned in a remote location from the supervised area. Applying the use of video recording for supervising, controlling and the like can be either on-line or off-line for later inspection. Frequently, the zone captured by one video camera is insufficient and a number of cameras are required for providing an efficient supervision of the observed particular area. A video camera used for tracking can capture a large zone providing a wide perspective of the supervised area. Occasionally, the zone recorded has a plain pattern that enables a person viewing the monitor to track protruding changes. Thus, in some cases a change in the pattern can be perceptible immediately due to the sharp and obvious change within the video recording presented. One example may be a video recording of passage seldom used having trespassed by an intruder. However, the pattern changes in a video recording may not be always obvious and immediately tracked by a person monitoring the recording or the recording may not be continuously attained. Furthermore, when areas supervised are large or demand for great skill for monitoring the process can require costly resources for skillful personnel that are limited to the human eye perceiving ability. Consequently, not occasionally valuable information regarding to changes perceived by the video recording is left unnoticed and unprocessed, resulting with valuable information being lost. One use of such supervising is within the military use were tracking movements of hostile forces is vital, and failing to duly track changes can apply harsh consequences. There is a growing need to prevent loss of valuable information concealed within unprocessed video recording. Furthermore, there is need to evaluate on-line video recordings for urgent purposes and for information of highly importance. There is a further need to provide an immediate alert when detecting an emergency situation or other urgent situation. There is a need for diminishing the need for large number of skillful personnel for supervising and analyzing video recordings.

There is therefore a need in the art for a system and method for detection and analysis of video recordings.

SUMMARY OF THE INVENTION

A system and method for detection and analysis of video recording is disclosed.

The method comprises receiving a video recording, calculating complexity values of video recording received, comparing the calculated complexity values with reference complexity values, and displaying analysis of video recording on a user interface is disclosed.

The system comprises an input device for receiving video recording, a computing device for calculating complex values of received video recording, a comparator device for comparing complex values of video recording, and a storage device for storing internal data.

DETAILED DESCRIPTION OF PREFERRED EMBODIMENTS

Figure 1:
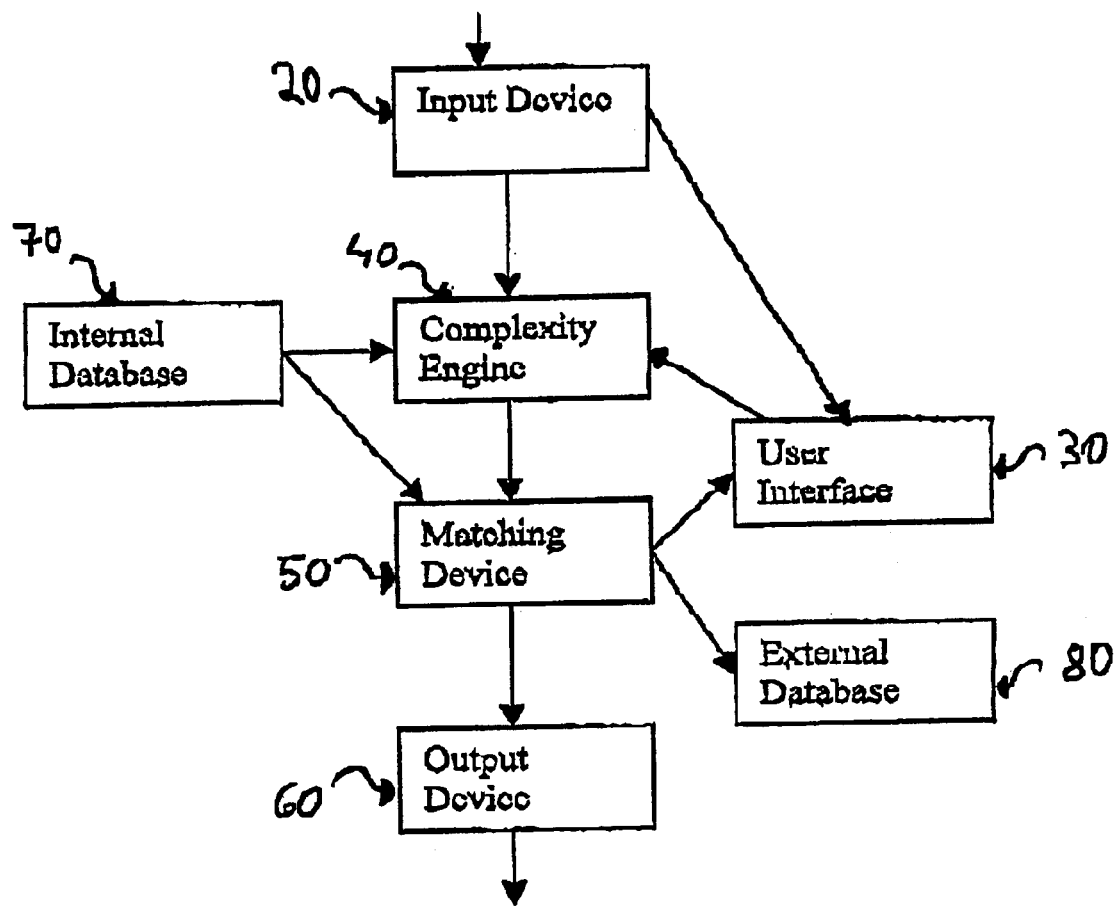
FIG. 1 illustrates a preferred embodiment of the present invention and particularly a video detection and analysis system and method for detecting and analyzing video recordings received by the system.

The present invention provides a video detection and analysis system and method (VDAS) for detecting and analyzing video recordings received by the VDAS. The present invention provides the use of the complexity data analysis (CDA) method and system presented within PCT Application PCT/IL01/01074, related patent application to the present invention, which is incorporated herein by reference. Thus, the present invention detects and analyzes video recordings activating the CDA method and system providing valuable information prior to performing a time consuming video recordings processing detection and analysis by monitoring persons. The use of the CDA method for detecting and analyzing valuable information of video recordings is possible by exploiting a characteristic attribute of each video recording has, and the possibility of the VDAS to calculate a complexity value of each video recording. The complexity characteristic attribute value of a known video recording stored within the VDAS enables to determine whether the current calculated complexity of the video recording differs from the known position of objects within the supervised or viewed area. Furthermore, the VDAS can determine the video recording reference for the comparison and can perform an analysis either on-line or off-line. The method used within the VDAS enables to detect and analyze changes that cannot be detected by a human eye. Furthermore, the VDAS can accurately estimate the changes between video recordings compared.

The VDAS calculates and provides complexity values to video recording using the complexity engine as within PCT Application PCT/IL01/01074. The complexity engine prior to activating its process for providing complexity values draws relevant parameters from the internal database. A user at the user interface can insert parameters to the internal database. After calculating complexity values of the video recording by the complexity engine, the comparison device receives the complexity value form the complexity engine. The comparison device compares the complexity value of the video recording input received from the complexity engine with known complexity values relating to video recordings previously inserted to the VDAS. The complexity value that the current input complexity is to be compared to is designated within the internal database. The VDAS can generate an alarm when the comparison result within the comparison device crosses a threshold provided by the internal database. The results of the detection and analysis is presented to the user at the user interface and stored within external database. The output device conveys the video recording to any predetermined destination such as an ordinary processing location. One skilled in the art can appreciate that in a similar manner the VDAS can detect and analyze on-line video recordings as well. The VDAS will be better understood relating to FIG. 1.

FIG. 1 depicts a block diagram illustrating the VDAS, designated 10. The VDAS 10 includes an input device 20, a user interface 30, an external database 80, an output device 60, an internal database 70, a complexity engine 40 and a comparison or matching device 50. The input device 20 is a device for receiving video recordings. According to one preferred embodiment the input device 20 is a video receiver with a digital converter. According to the preferred embodiment the recording source is familiar to the user. The user interface 30 according to the present embodiment can include a screen (not shown) and an input device (not shown) such as a keyboard. The user, according to the present embodiment can indicate the source of the video recording and can insert relevant parameters to the internal database 70. The internal database 70 conveys parameters, inserted by user as well as others, (according to PCT Application PCT/IL01/01074), to the complexity engine 40. The complexity engine 40 activates the CDA on the recording and calculates its complexity value using parameters received from the internal database 70. The complexity engine 40 calculates the complexity of the video recording and sends a complexity metric (i.e. every area within the frame and along the frames has a complexity parameter). The complexity value of the video recording alongside with the recording is stored within the external database 80. The comparison or matching device 50 compares a known, determinate within the internal database 70, complexity value of the area captured by a video recording, provided by the external database 80, with the calculated complexity value received from the complexity engine 40 of the same supervised area. The comparison or matching device 50 can provide an alert in case of a trespass of a threshold data, received from the internal database 70, of difference value received as a result of the comparison execution within the comparison or matching device 50. The comparison or matching device 50 generates an alert provided to the user interface 30 with a warning. The comparison or matching device 50 presents user interface 30 with the video recording received as input at the input device 20 as well as with statistics relating to the current recording and other relevant recordings stored within the external database 80. One skilled in the art can easy percept that the above preferred embodiment can be either on-line or off-line.

The person skilled in the art will appreciate that what has been shown is not limited to the description above. Those skilled in the art to which this invention pertains will appreciate many modifications and other embodiments of the invention. It will be apparent that the present invention is not limited to the specific embodiments disclosed and those modifications and other embodiments are intended to be included within the scope of the invention. Although specific terms are employed herein, they are used in a generic and descriptive sense only and not for purposes of limitation. The invention, therefore, should not be restricted, except to the following claims are their equivalents.

What is claimed is:

1. A method for detection and analysis of video recording, the method comprising:

receiving a video recording;

calculating complexity values of video recording received, wherein the calculating of complexity values comprises the following steps, partitioning said video recording into sub-unit blocks of a pre-determined size;

creating at least one complexity catalog based on said video recording, the complexity catalog containing complexity values of the sub-unit blocks; and characterized in that the step of creating the at least one complexity catalog comprises:

creating a list of word sizes concerning the content of the sub-unit blocks in accordance with the format of said video recording;

determining a range of values constituting the sub-unit block in accordance with the format of said video recording;

computing a usage value for each word size in the list of word sizes, the usage value being the ratio between the number of different words present in the sub-unit block to the maximum number of possible words; and computing the complexity value of the sub-unit block, the complexity value being the product of the usage values obtained in the previous step;

comparing the calculated complexity values with reference complexity values; and displaying analysis of video recording on a user interface.

2. The method of claim 1 wherein the reference complexity values are internal complexity parameters.

3. The method of claim 1 wherein the reference complexity values are complexity values calculated for a video recording recorded at a predetermined time.

4. A system for detection and analysis of video recording, the system comprises:

an input device for receiving video recording;

a dividing component to partition the video recording into sub-unit blocks;

a computing device for calculating complex values of received video recording, wherein the computing device comprises, an infrastructure server device for processing at least one video recording unit introduced by the input device, a complexity catalog; and a complexity catalog to hold at least one list of complexity values associated with the partitioned sub-unit blocks, a complexity value is the product of usage values of all word sizes in a list of word sizes, the usage value being the ratio between the number of different words present in the sub-unit block to the maximum number of possible words within said sub-unit block;

a comparator device for comparing complex values of video recording; and a storage device for storing internal database.

5. The method of claim 1 further comprising the step of normalizing the sub-unit block content values according to said range of values.

* * * * *